United States Patent [19]

Secretan

[11] Patent Number: 4,973,893
[45] Date of Patent: Nov. 27, 1990

[54] PISTON AND DRUM DRIVE SYSTEM
[75] Inventor: Stanley Secretan, Leona Valley, Calif.
[73] Assignee: Allied-Signal Inc., Morris Township, N.J.
[21] Appl. No.: 459,204
[22] Filed: Dec. 12, 1989
[51] Int. Cl.⁵ .............................................. H02P 1/22
[52] U.S. Cl. ..................................... 318/280; 318/10; 242/54 R; 254/361; 254/292
[58] Field of Search ...................... 318/6, 9, 10, 14, 15, 318/256, 280; 60/419, 420, 423; 74/848, 853, 868, 869; 91/18, 19, 42, 43, 45, 420, 486, 487, 488; 114/253, 254, 268; 242/54 R, 75.51, 75.53; 254/93 R, 266, 288, 289, 291, 292, 302, 309, 315, 316, 317, 318, 361, 362

[56] References Cited

U.S. PATENT DOCUMENTS

| | | | |
|---|---|---|---|
| 2,443,763 | 6/1948 | Dahlgren et al. | 254/361 X |
| 3,206,628 | 9/1965 | Korthaus et al. | 74/848 X |
| 3,448,962 | 6/1969 | Miller | 254/291 |
| 3,807,697 | 4/1974 | Cotreau et al. | 254/316 X |
| 3,836,121 | 9/1974 | Jones | 254/292 X |
| 4,042,214 | 8/1977 | Brener | 254/266 |
| 4,169,580 | 10/1979 | Hatlapa et al. | 254/361 |
| 4,275,870 | 6/1981 | Henneman et al. | 254/361 |
| 4,404,891 | 9/1983 | Turnquist et al. | 254/361 X |

Primary Examiner—Bentsu Ro
Attorney, Agent, or Firm—Robert C. Smith; Robert A. Walsh

[57] ABSTRACT

A drum and piston drive system incorporates within the interior of a drum used for reeling cable in and out, a reversible electric motor which drives the drum from the inside through a gearset. Also carried within the drum is a manifold structure including a gear pump driven directly from the opposite end of the reversible motor operating in a closed hydraulic circuit to supply hydraulic pressure to reversibly move a piston in a cylinder. The manifold includes check valves limiting the pump output pressure, and a pair of accumulators which maintain a desired pressure on both sides of the pump to avoid cavitation. Relief valves in the manifold limit the pressure to the piston and check valves in each line to the cylinder block reverse flow. The system operates to control and coordinate drum rotation movement and direction with the direction and movement of the piston.

15 Claims, 5 Drawing Sheets

PISTON AND DRUM DRIVE SYSTEM

This invention relates to a piston and drum drive system and more particularly to a compact structure wherein a drum drive and a piston actuating drive are positioned within the hollow interior of the drum and operate to turn the drum and to actuate the piston in a desired direction.

BACKGROUND OF THE INVENTION

There are applications in which it is desirable to operate a drum to raise or lower a load at the end of a cable wound on the drum and in a coordinated manner to operate a piston to drive a reversible mechanism such that the mechanism moves in one direction as the drum rotates to lower the load at the end of the cable and in the opposite direction as the drum is rotated in the opposite direction to raise the load.

In an earlier construction the electric motor was external to the drum and operated an external pump driving a hydraulic motor. Only the hydraulic motor was carried in the drum. The resulting hydraulic lines were of significant length and there was a complication in matching the pump output to the hydraulic motor. The result was that the installation was more complicated, the hydraulic line losses were substantial, space was not well utilized and the system was generally somewhat inefficient.

SUMMARY OF THE INVENTION

Applicant has devised a piston and drum drive structure in which most of the inefficiencies described above have been eliminated, both as to use of space and as to energy consumption. By placing the electric motor inside the drum and using its shaft output to drive the drum directly through a gear set, the hydraulic line losses in driving the drum are eliminated and the hydraulic motor is totally eliminated. The opposite end of the motor shaft is connected directly or through a clutch to a compact manifold structure also within the drum and which contains the hydraulic pump, two hydraulic accumulators, certain necessary relief valves and check valves and interconnecting lines which are very short, leaving as the only external lines those from the manifold to the external drive piston.

DESCRIPTION OF THE PREFERRED EMBODIMENT

Figure 1:
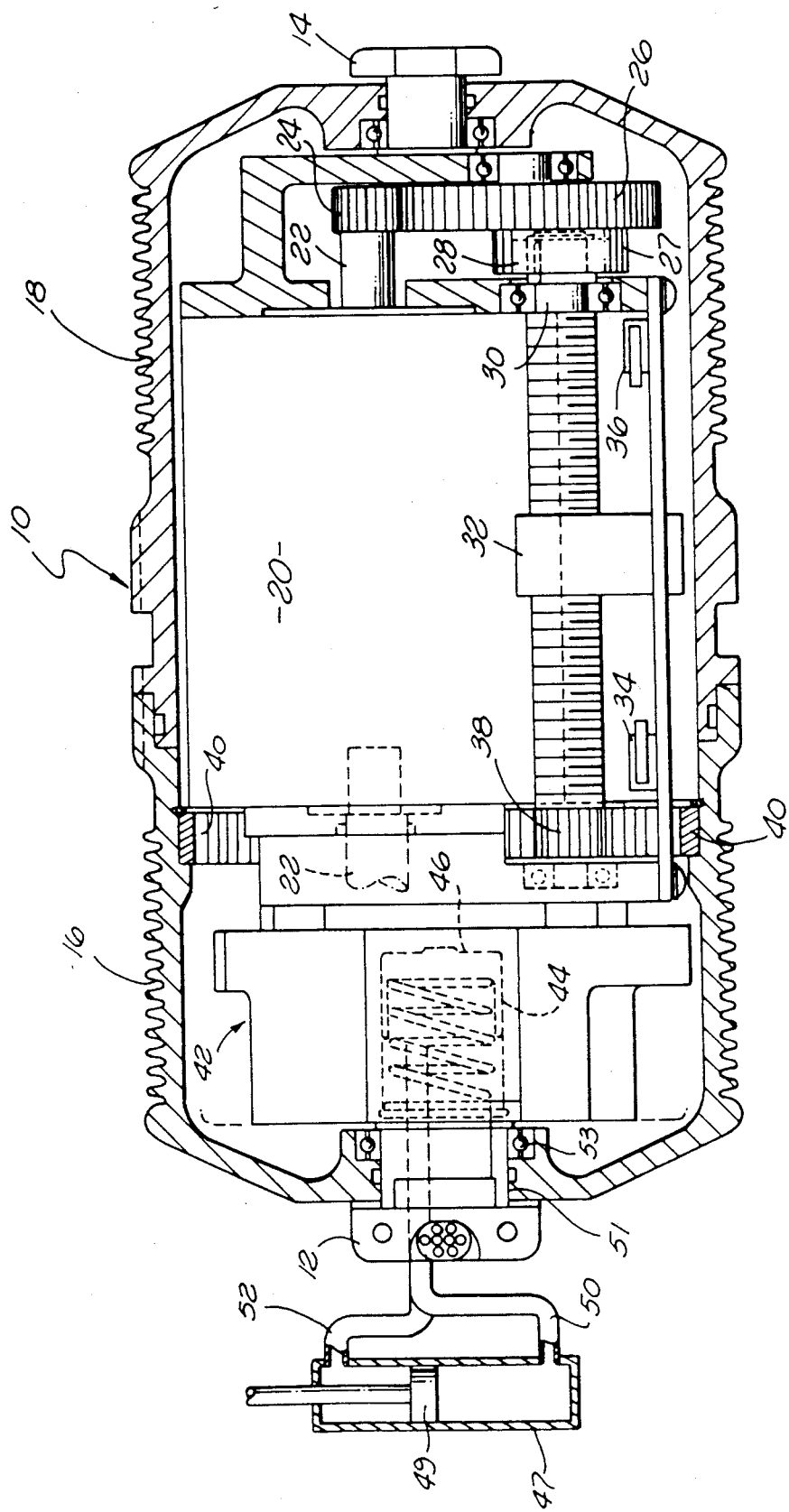
FIG. 1 is a longitudinal drawing partly in section of a piston and drum drive structure according to the invention.

Referring now to FIG. 1, a piston and drum drive structure is shown including a drum 10 rotatably supported in mounting brackets 12, 14. Drum 10 carries two sets of spiral left and right hand grooves 16, 18 which support cables (not shown) for reeling a load out (down) from the drum and pulling it in or up). Carried within the drum is a D.C. motor 20 having an output shaft 22. Attached to shaft 22 is a pinion gear 24 which drives a gear reduction gear set including gears 26, 27, and 28. Gear 28 is carried on a shaft 30 which includes a lead screw and a follower 32 operable between a pair of limit switches 34, 36 whose function is to cause rotation of the drum 10 to stop and to reset the polarity of the electric motor drive so than when next energized, the motor 20 will turn in the opposite direction. At the opposite end of shaft 30 is a pinion 38 which drives an internal gear 40 on the inside surface of the drum 10. By using the shaft 30, the drum is driven from a point not far displaced from the center rather than near one end as would be the case if the internal gear 40 were driven from the right end of the drum. At the same time the shaft carrying the driving pinion 28 also provides a means for operating the limit switches.

At the opposite end of motor 20, shaft 22 is connected to a hydraulic pump which is part of a manifold structure 42. Shown in phantom is an accumulator 44 including a piston 46 and a spring 48. The manifold 42 including the motor-driven pump, supplies hydraulic fluid under pressure to an external actuating cylinder 47 including a piston 49 through a pair of conduits 50, 52. This manifold is described in greater detail in connection with FIGS. 3 through 8. Also part of manifold 42 is an axially extending boss 51 including a bearing 53 supporting one end of drum 10.

Figure 2:
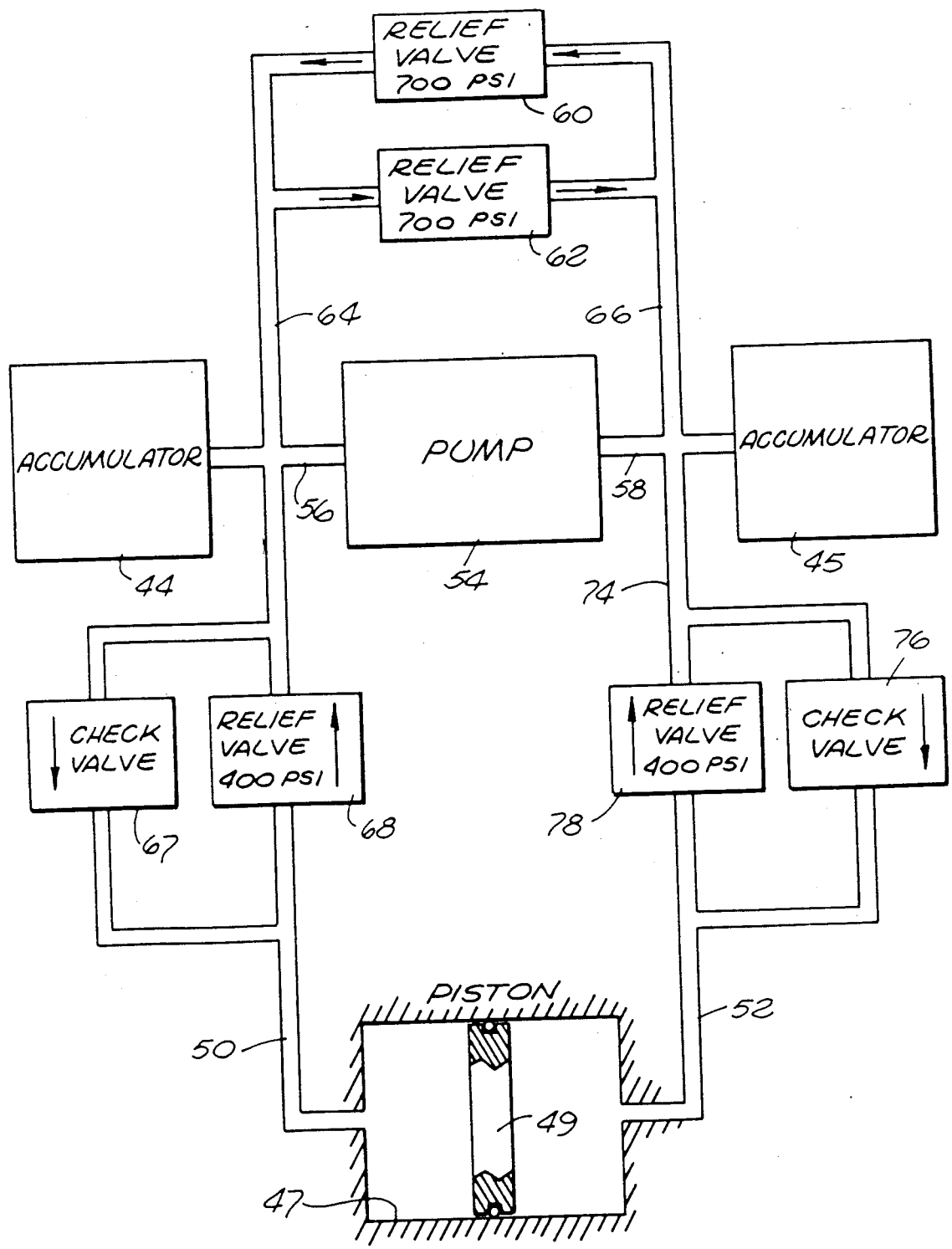
FIG. 2 is a schematic diagram of the hydraulic circuit employed in the system.

The hydraulic circuit of the above described system is shown in schematic form on FIG. 2 and includes a pump 54 driven by shaft 22 which is reversible along with motor 20 to supply hydraulic fluid under substantial pressure to either of conduits 56 or 58. These conduits connect directly with hydraulic accumulators 44 and 45, respectively. A pair of oppositely directed relief valves 60 and 62 set to pressure levels somewhat above the normal operating pressure are connected to lines 56 and 58 through conduits 64 and 66 respectively such that they are connected across the pump outlet in each direction. Conduit 56 is connected through a conduit 64 to a check valve 67 and an oppositely directed relief valve 68. These valves are connected through conduit 50 to one side of a piston 49 in a cylinder 47. Conduit 58 is connected through a conduit 74 to a check valve 76 and an oppositely directed relief valve 78, which valves are connected through conduit 52 to the opposite side of piston 49. It will be appreciated that when motor 20 rotates in a first direction it will also cause pump 54 to supply fluid under pressure to accumulator 44 and through check valve 67 and conduit 50 to the left side of piston 49, causing piston 49 to move toward the right. This will force fluid from the right side of cylinder 47 through conduit 52 and relief valve 78 to the conduit 58 and the opposite side of the pump 54. The fluid will also build pressure in accumulator 45 whose primary purpose is to assure adequate fluid pressure on the inlet side of the pump to avoid cavitation. Rotation of the motor 20 in the opposite direction will result in the pump 54 pumping fluid toward accumulator 45 through check valve 76 and to the right side of piston 49 in a manner analogous to that described above. When motor 20 is stopped, fluid is trapped on both sides of piston 47 by closed relief valves 68 and 78, effectively locking piston 47 in position.

Figure 3:
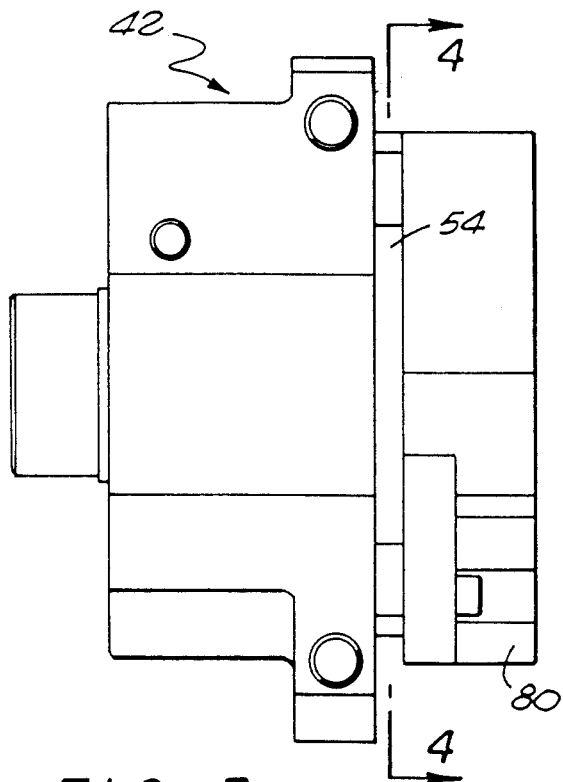
FIG. 3 is a side view of the manifold shown in FIG. 1.
Figure 4:
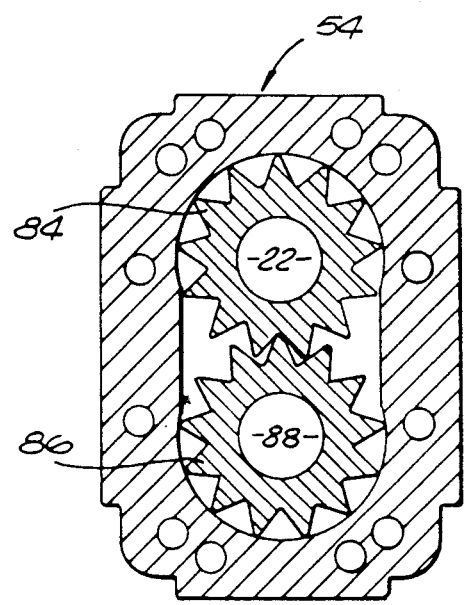
FIG. 4 is a sectional view along line 4—4 of FIG. 3.
Figure 5:
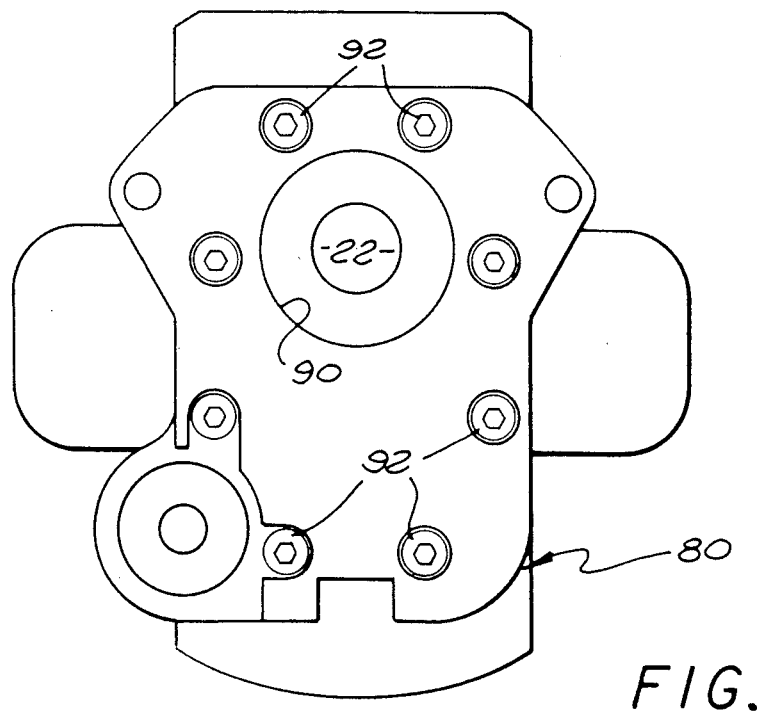
FIG. 5 is a view from the rear of the manifold of FIG. 3.

The manifold 42 is shown and described in detail in FIGS. 3 through 8. FIG. 3 is a side view of the manifold 42 including the hydraulic gear pump 54 and a support structure 80. FIG. 4 is a sectional view taken along line 4—4 of FIG. 3. It will be seen that pump 54 is a conventional gear pump including a driving gear 84 carried on the motor shaft 22 and a driven gear 86 carried on a stub shaft 88 supported in the housing of manifold 42 and support structure 80. The side of support structure 80 facing the electric motor 20 (of FIG. 1) is shown in FIG. 5. In this view is shown a recess 90 receiving a boss which supports motor shaft 22. Structure 80 is bolted to the housing of manifold 42 by means of a plurality of screws 2.

Figure 6:
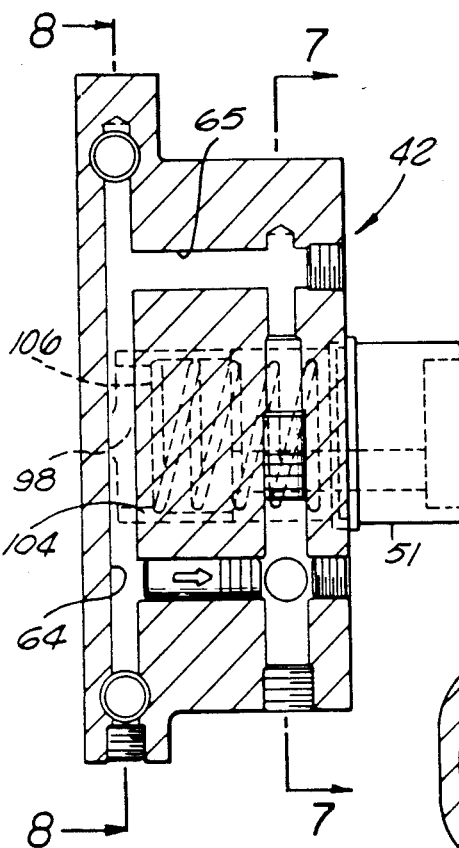
FIG. 6 is a partial sectional view through the hydraulic manifold structure employed in the system.
Figure 8:
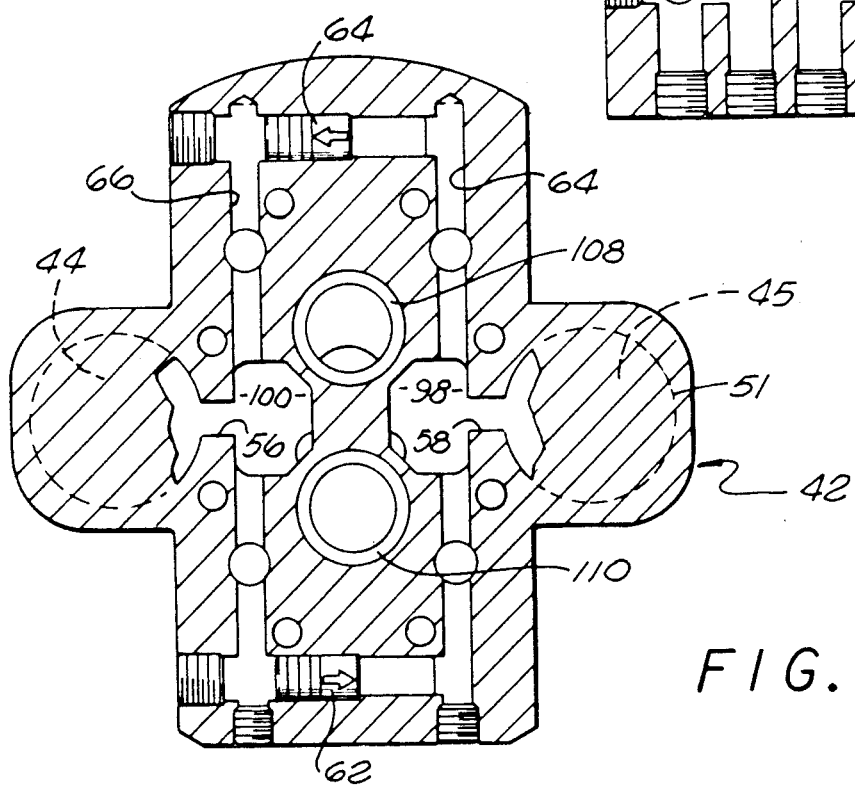
FIG. 8 is a sectional view of the manifold of FIGS. 3 through 6 taken along line 8—8 of FIG. 6.

FIG. 6 is a view of manifold 42, partly in section, which shows the opposite side from that shown in FIG. 3 In this view are shown high pressure lines 64, 65 which receive hydraulic fluid under pressure from pump 54. At its center, line 64 communicates with a chamber 98 which receives the output from pump 54 (FIG. 8). Also shown in FIG. 8 is a second high pressure line 66 which communicates with a second output chamber 100. Chamber 00 is connected with accumulator 44 through a short passage 56. A similar short passage 58 connects chamber 8 with accumulator 45, also shown in FIG. 6 and which includes a piston 104 and a spring 106. Also shown in FIG. 8 are bushings 108 and 110 which align and support shafts 22 and 88 carrying pump gears 84 and 86. The high pressure relief valves 62 and 60 are also shown connected between the high pressure lines 64 and 66. Boss 51 is shown in FIG. 6 and in phantom in FIG. 8.

Figure 7:
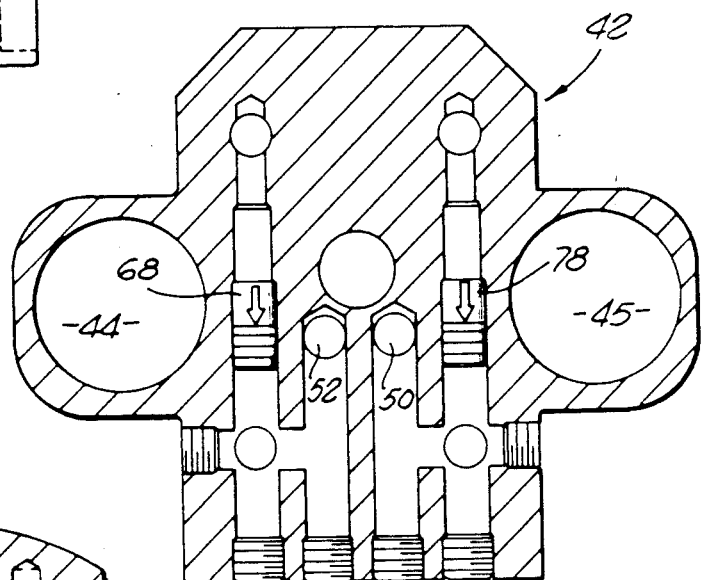
FIG. 7 is a sectional view of the manifold of FIGS. 3 through 6 taken along line 7—7 of FIG. 6.

FIG. 7, which is a sectional view taken along line 7—7 of FIG. 6 cuts through both of accumulators 44 and 45 as well as a number of controlled pressure lines carrying relief valves 68 and 78. On the downstream side of relief valves 68 and 78 are outlet passages 50 and 52 which lead to the actuating cylinder 47. The ends of the passages shown are plugged since it is necessary to form the various passages by drilling into the manifold 42 and then inserting plugs where needed to close the ends.

Figure 9:
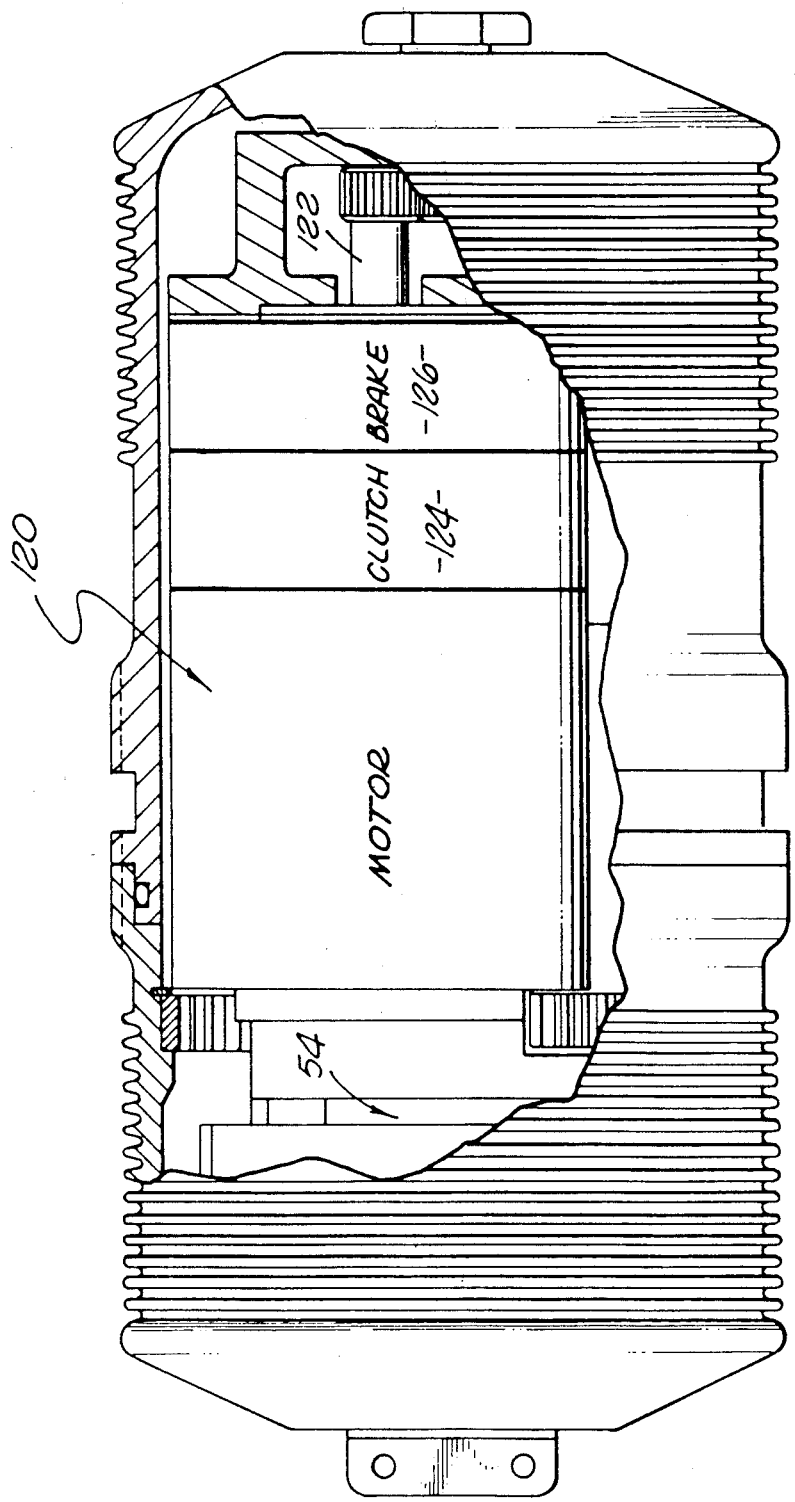
FIG. 9 is a schematic drawing of an alternate form of motor assembly incorporated into the structure of FIG. 1.

Greater flexibility in operation can be provided through use of a motor of the type shown in FIG. 9. Motor assembly 120 includes, in addition to the motor, a clutch 124 and a brake assembly 126, both of which are mounted on and coaxial with the motor shaft 122. While the clutch and brake can be electronically and mechanically connected in a number of operating configurations, an arrangement which has been used by the applicant operates with the brake normally engaged with the drum, (deenergized) which locks the drum to its mounting structure preventing the drum from rotating and holding the suspended load in position. When the brake 126 is energized, it is released and the motor 120 then drives the drum as desired to raise or lower the load. In this arrangement the pump 54 is always connected to the motor 120 so that the piston is actuated whether or not the load is raised or lowered. This could be reversed as will be understood by those skilled in the art. The brake assembly 126 may be manually operated or it may be connected into a drum drive control system which includes means to secure shaft 122 in a desired position and/or to sense the approach of the load to either its fully extended position or its fully retracted position such that the cables are prevented from receiving a severe shock either from having the load stopped suddenly at the end of the cable track, or from striking an obstacle at the fully retracted position.

In operation with the system of FIGS. 1 through 8, an electrical request to lower or pay out a load from the drum results in causing the motor 20 to turn in such direction as to reel the load out and simultaneously to drive the pump 54 to move piston 49 to the right in cylinder 47 (as shown in FIG. 2). Fluid from the right side of piston 47 will then return to the pump 54 as described above. A request to raise the load will cause the electric motor 20 to rotate in the opposite direction, turning drum 10 in the direction to reel the load in (or up). At this time, the pump 54 will be turned in the opposite direction causing piston 49 to move to the left.

In the event that motor assembly 120 of FIG. 9 is used, initial operation of the motor may occur with the clutch 124 disengaged such that the pump turns but the drum does not turn. In some applications it may be desired to delay operation of the drum 10 until the drum is at or near the end of its cycle or to defer operating the drum at all for some cycles. On the return part of the cycle, it may be that the operator will want the drum to operate at the outset or later in the cycle. Whether it is desired that the pump operates simultaneously with the drum, or at different times in the cycle, rotation of the drum in a given direction always results in the pump moving in a particular direction because they are effectively being driven from the same shaft. The brake 126 serves primarily to hold the shaft 122 in a desired position and to prevent it from rotating as might be the case if some extraneous force were to tension the cables.

From the foregoing it will be recognized that the above described drive system has numerous advantages in that it is very economical of space, is efficient in the use of energy, has much simplified hydraulic lines as compared with the earlier system described above, and as a result is more reliable. While only one embodiment has been shown and described herein, those skilled in the art will be aware of modifications and I do not desire to be limited to the specific embodiment described.

What is claimed is:

1. A drive system for rotating a drum and actuating a piston including a drum, a cylinder with a piston in said cylinder, an electric motor having an output shaft operatively connected to said drum, a source of hydraulic fluid, a pump, and conduit means connecting said pump to said piston;

characterized in that said electric motor is positioned inside said drum, a gear set is driven by said electric motor and includes an internal gear on the inside surface of said drum to drive said drum, said pump is located within said drum and is driven by said electric motor, and said conduit means comprises a manifold structure including first and second high pressure conduits connected to said pump, first and second accumulators connected to said first and second high pressure conduits, respectively, first and second oppositely directed high pressure relief valves connected between said first and second conduits, a check valve and an oppositely directed relief valve connected in parallel to each other and to each of said first and second conduits, and third and fourth conduits connecting the opposite sides of each of said check valve and oppositely directed relief valve to opposite sides of said piston.

2. A drive system as set forth in claim 1 wherein said manifold structure is also positioned within said drum.

3. A drive system as set forth in claim 1 wherein said electric motor drive shaft extending from both ends thereof and said gear set is driven at one end of said shaft and said pump is driven at the opposite end of said shaft.

4. A drive system as set forth in claim 3 wherein said electric motor is reversible to reverse the direction of rotation of said drum and the direction of movement of said piston.

5. A drive system as set forth in claim 1 wherein said electric motor includes coaxially mounted clutch and brake assemblies with said clutch assembly being selectively operative to permit operation of said pump without concurrent operation of said drum.

6. A drive system as set forth in claim 1 wherein said relief valves operate to block flow from both sides of said piston when said pump is not operating, thereby locking said piston in position.

7. A drum and piston drive system including a piston in a cylinder, a rotatable drum having an inner surface, an electric motor physically positioned within said drum having a drive shaft, gear reduction means within said drum driven by said drive shaft including an internal gear on the inside of said drum, a source of operating fluid, a gear pump within said drum driven by said drive shaft and connected to said source, a manifold member within said drum connected to receive fluid from said gear pump, said manifold member including first and second high pressure inlet conduits, first and second accumulators connected to said first and second conduits, respectively, first and second pressure relief valves connected between said first and second inlet conduits to limit pressure therein, a check valve and an oppositely directed relief valve connected to each of said first and second conduits, and third and fourth conduits connected to the opposite sides of each said check valve and said oppositely directed relief valve and to opposite sides of said piston, said oppositely directed relief valves being closed and serving to lock said piston in position when said gear pump is not operating.

8. A drive as set forth in claim 7 wherein said electric motor drive a shaft extending from both ends thereof and said gear reduction means is driven at one end of said shaft and said pump is driven at the opposite end of said shaft.

9. A drive system as set forth in claim 7 wherein said electric motor is reversible to reverse the direction of rotation of said drum and the direction of movement of said piston.

10. A drive system as set forth in claim 9 wherein said electric motor includes coaxially mounted clutch and brake assemblies with said clutch assembly being selectively operative to permit operation of said pump without concurrent operation of said drum.

11. A drive system for rotating a drum and actuating a piston including an electric motor carried within said drum, said motor having a drive shaft, gear reduction means in said drum driven by said drive shaft including a driven gear on the interior surface of said drum, a gear pump in said drum driven by said drive shaft and a manifold in said drum connected to receive fluid from said gear pump, said manifold including first and second high pressure inlet conduits connected to said pump, first and second accumulators connected to said first and second high pressure inlet conduits, respectively, first and second oppositely directed relief valves connected between said first and second conduits, a check valve and an oppositely directed relief valve connected in parallel to each of said first and second conduits, and third and fourth conduits connected to the opposite sides of each said check valve and said oppositely directed relief valve and to opposite sides of said piston.

12. A drive system,.as set forth in claim 11 wherein said electric motor drive shaft extending from both ends thereof and said gear reduction means is driven at one end of said shaft and said pump is driven at the opposite end of said shaft.

13. A drive system as set forth in claim 12 wherein said electric motor is reversible to reverse the direction of rotation of said drum and the direction of movement of said piston.

14. A drive system as set forth in claim 13 where said electric motor includes coaxially mounted clutch and brake assemblies with said clutch assembly being selectively operative to permit operation of said pump without concurrent operation of said drum.

15. A drive system as set forth in claim 11 wherein said relief valves operate to block flow from both sides of said piston when said pump is not operating, thereby locking said piston in position.

* * * * *